(12) United States Patent
Bluvband et al.

(10) Patent No.: US 8,832,497 B2
(45) Date of Patent: Sep. 9, 2014

(54) METHODS, APPARATUS AND SYSTEMS FOR PERFORMING DYNAMIC FAULT TREE ANALYSIS

(75) Inventors: Zigmund Bluvband, Rishon LeZion (IL); Sergey Porotsky, Yehud (IL)

(73) Assignee: A.L.D. Advanced Logistics Development Ltd, Tel Aviv (IL)

( * ) Notice: Subject to any disclaimer, the term of this patent is extended or adjusted under 35 U.S.C. 154(b) by 309 days.

(21) Appl. No.: 13/367,388

(22) Filed: Feb. 7, 2012

(65) Prior Publication Data

US 2013/0205170 A1   Aug. 8, 2013

(51) Int. Cl.
*G06F 11/00*   (2006.01)

(52) U.S. Cl.
USPC .......................................................... 714/26

(58) Field of Classification Search
CPC ............ G06F 11/3447; G06F 11/3452; G06F 11/3466; G06F 2201/81
See application file for complete search history.

(56) References Cited

U.S. PATENT DOCUMENTS

| | | | |
|---|---|---|---|
| 2003/0070108 A1* | 4/2003 | Groen et al. | 714/1 |
| 2007/0028219 A1* | 2/2007 | Miller et al. | 717/124 |
| 2007/0028220 A1* | 2/2007 | Miller et al. | 717/124 |

* cited by examiner

*Primary Examiner* — Charles Ehne
(74) *Attorney, Agent, or Firm* — Vladimir Sherman; Professional Patent Solutions

(57) ABSTRACT

Disclosed is a dynamic fault tree analysis system including a fault tree module associated with a mission critical system (mcs), wherein said fault tree module includes at least one item characterized by an initial probability density function (pdf), at least one threshold value associated with the mcs, a sampling module to transform the initial pdf to a heterogeneous pdf (hpdf), wherein the hpdf includes at least one continuous segment and at least one discrete segment, and wherein transition between segments is at least partially based on the at least one threshold; and a stochastic simulator to determine the probability of an mcs failure condition by analyzing the fault tree module using the heterogeneous pdf.

20 Claims, 4 Drawing Sheets

METHODS, APPARATUS AND SYSTEMS FOR PERFORMING DYNAMIC FAULT TREE ANALYSIS

FIELD OF THE INVENTION

The present invention relates generally to the field of fault tree analysis More specifically, the present invention relates to methods, apparatus, systems and associated computer executable code for performing dynamic fault tree analysis

BACKGROUND

Fault tree analysis (FTA) is a failure analysis in which an undesired state of a system may be analyzed using Boolean logic to combine a series of events. This analysis method may be used in such fields as safety engineering and reliability engineering to determine the probability of a safety accident or a particular system level failure.

Several different types of FTAs are known such as static and dynamic FTA. FTA varies depending on the elements of a tree, its size, the level of accuracy required and more. For example, depending on the system the fault tree may be comprised of regular Boolean logic gates or Dynamic gates (such as Priority AND, Sequence enforcing or SPARE gates) may be used. For large fault trees approximation methods may be used. For smaller fault trees analytical methods may be used for FTA, such as using Markov chains and modularization methods

SUMMARY OF THE INVENTION

The present invention includes methods, apparatus, systems and associated computer executable code for performing dynamic fault tree analysis.

According to some embodiments a simulation may be performed on a given Fault Tree using heterogeneous Importance Samplings. According to some embodiments, the heterogeneous Importance Samplings may be characterized by both continuous and discrete Probability Distribution Functions (PDF). Optionally, transitioning between the use of continuous and discrete PDFs may be based on a threshold specific to operational parameters of the simulation being performed. According to further embodiments, the given importance sampling (GIS) may be characterized by a malfunction/fault/failure-event rate which is higher than statistically accurate for the given fault tree. According to further embodiments Mapping, Scaling and/or Transforming results from the GIS based simulation to a simulation result which is substantially accurate for the given Fault Tree may be carried out.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
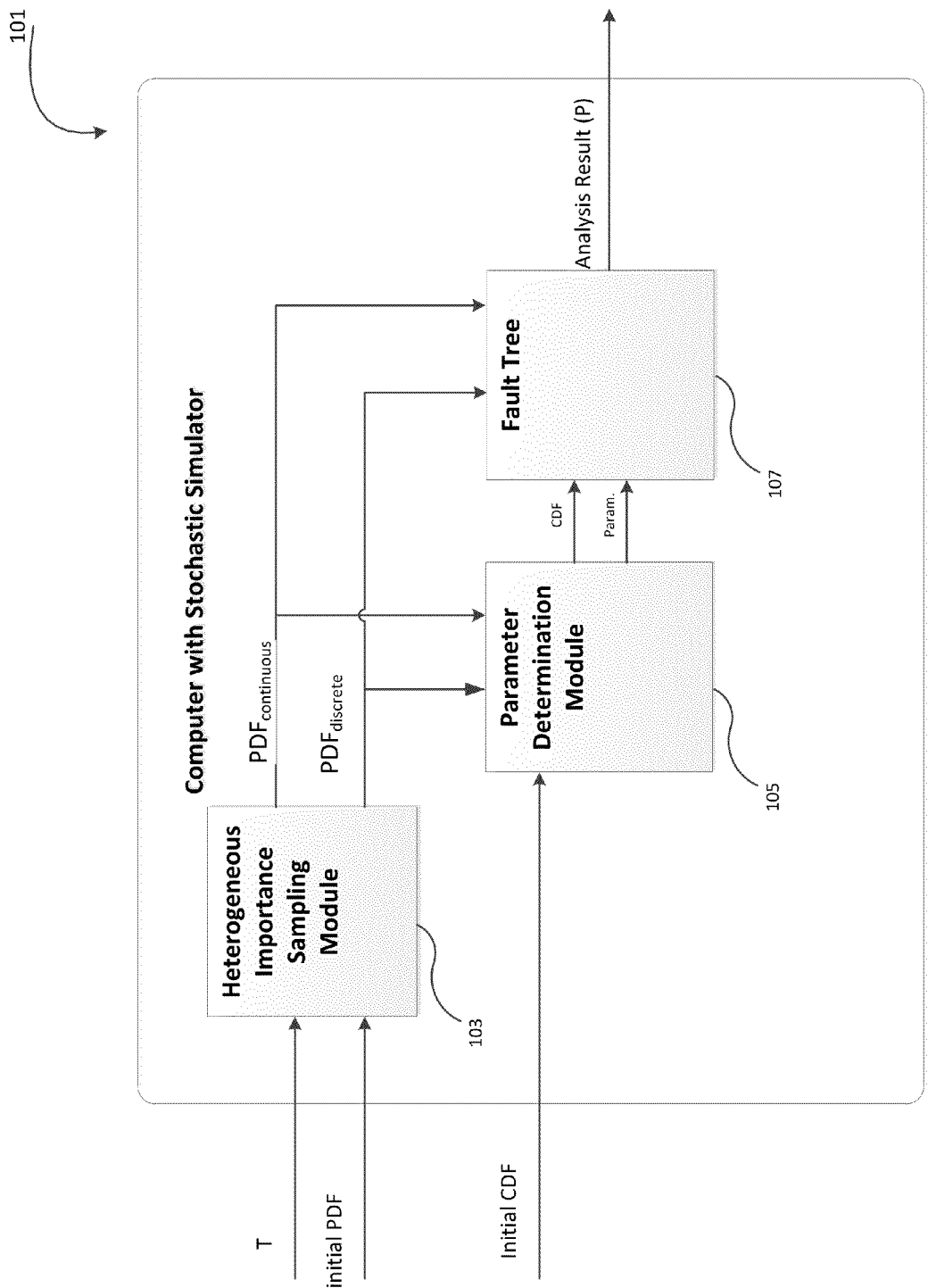
FIG. 1 shows an apparatus for performing FTA in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

FTA may be used in systems as part of safety or reliability checks carried out on the system. Systems requiring FTA may be vehicles, planes, nuclear plants and more. Generally, the fault tree may include different events on different elements of the system. For example, a passenger vehicle's fault tree may include such events as engine failure, electrical failure, steering wheel failure, brake failure and more. The different events organized in a Boolean tree may be analyzed to calculate the probability of system level failure (such as a car crash, loss of aircraft function inflight or nuclear meltdown) depending on the combination of the different events and each of their probabilities.

In some cases a static fault tree may be sufficient for analysis. Generally, static fault trees may not take into consideration (e.g. disregard, independent of, etc.) delays or timing between different events. Accordingly, for some systems may a dynamic fault tree may be preferable due to the fact that a dynamic fault tree may be adapted to take into account additional factors such as the sequence of events, timing associated with when events took place, and more.

Dynamic fault trees may be analyzed analytically by known methods such as minimal cut sets, Markov Chains, and more. However, in some complex models it may be preferable to utilize a Stochastic Simulator such as a Monte Carlo analysis. However, for some simulations the FTA result may requires a high level of accuracy—For example, an aircraft's reliability estimations typically requires that system level failure probability is lower than $10^{-8}$. Thus a system level failure or loss of aircraft function inflight may be considered a rare event. While non-rare event estimation may require $10^4$ simulations, rare event estimations may require $10^{10}$ iterations of a stochastic simulator. Thus, for rare event estimations, using a stochastic simulator may not be feasible or efficient—given that using known sampling methods would not allow the simulation to run in a commercially feasible manner. It is thus understood that for some dynamic fault trees using Monte Carlo simulations set to a required accuracy which includes rare events it may be desirable to perform an improved method for FTA. It is also understood that although such a method may be designed to enable more efficient and more accurate analysis of the described fault trees some embodiments taught below may be utilized in additional fault trees such as dynamic fault trees which do not include rare events or static fault trees.

The present invention includes methods, apparatus, systems and associated computer executable code for performing dynamic fault tree analysis.

According to some embodiments a simulation may be performed on a given Fault Tree using heterogeneous Importance Samplings. According to some embodiments, the heterogeneous Importance Samplings may be characterized by both continuous and discrete Probability Distribution Functions (PDF). Optionally, transitioning between the use of continuous and discrete PDFs may be based on a threshold specific to operational parameters of the simulation being performed. According to further embodiments, the given importance sampling (GIS) may be characterized by a malfunction/fault/failure-event rate which is higher than statistically accurate for the given fault tree. According to further embodiments Mapping, Scaling and/or Transforming results from the GIS based simulation to a simulation result which is substantially accurate for the given Fault Tree may be carried out. There is provided according to an embodiment a dynamic fault tree analysis (dfta) system, which may include a fault tree module associated with a mission critical system (mcs), wherein said fault tree module includes at least one item characterized by an initial probability density function (pdf), at least one threshold value associated with the mcs, a sampling module to transform the initial pdf to a heterogeneous pdf (hpdf), wherein the hpdf includes at least one continuous segment and at least one discrete segment, wherein transition between segments is at least partially based on the at least one threshold, and a stochastic simulator to determine the probability of a mcs failure condition by analyzing the fault tree module using the heterogeneous pdf. In some embodiments, the mcs may be an airplane and the threshold value may be the airplane flight time.

In some embodiments the initial pdf may be associated with a cumulative distribution function (cdf) including one or more parameters.

In some embodiments the fta may further comprise a parameter determination module configured to utilize a stochastic simulation to calculate the one or more parameters associated with the cdf.

In some embodiments a parameter may be configured to limit total length of stochastic simulator simulation for determining the probability of a mcs failure.

In some embodiments the parameter determination module may be configured to recalculate the one or more parameters or rerun the simulation associated with the cdf if a simulation requirement has not been achieved. The simulation requirement may be selected from the group consisting of: a maximal amount of simulation cycles until system level failure is detected, a minimal amount of simulation cycles until system level failure is detected and a nominal amount of simulation cycles within a predefined range until system level failure is detected.

In some embodiments the parameter determination module may abort recalculation of the one or more parameters associated with the cdf if a maximal amount of recalculation cycles has been reached.

In some embodiments at least one initial pdf is represented by an exponential function or a Weibull functions. Optionally there may be more than one initial pdf and some may be represented by an exponential function while others are represented by Weibull functions. In some embodiment the stochastic simulator may be a computer configured to carry out Monte Carlo analysis.

There is provided, according to an embodiment, a method of calculating probability of mission critical system (mcs) failure comprising: receiving a fault tree associated with the mcs including at least one item, wherein the items are characterized by an initial probability density function (pdf), receiving at least one threshold value associated with the mcs, sampling the initial pdf and determining a heterogeneous pdf (hpdf) including at least one continuous segment and at least one discrete segment, wherein transition between segments is determined at least partially by the threshold; and performing a stochastic simulation on the fault tree utilizing the heterogeneous pdf to determine probability of a mcs failure condition In some embodiments, the method may further comprise the step of determining one or more parameters associated with the cdf with a stochastic simulator Turning now to FIG. 1, depicted is an apparatus for performing calculations such as computer 101 which may include a stochastic simulator. Computer 101 may include an importance sampling module such as Heterogeneous Importance Sampling Module. (HISM) 103 which may utilize a malfunction/fault/failure event rate which is higher than statistically accurate for the fault tree. HISM 103 may include or receive an initial Probability Density Function (PDF) which may be defined as the probability that an item will fail. Various known types of pdf functions may be used for different types of elements. For example:

Exponential function may be used to represent/express the time-to-failure (TTF) of electronic devices Truncated Exponential function may be used to represent the TTF of electronic devices with periodic testing/inspection.

Weibull with b<1—for TTF of devices at the reliability growth stage.

Weibull with b>1, Normal, Beta, Gamma—for TTF of mechanical devices on the "aging" stage or accelerated stress tests.

A pdf may be a function of time such as the lapsed time of a mission or the length of time the system has been operating or other. In accordance with some embodiments of the present invention, it is understood that failures occurring relative to a threshold specific to operational parameters of the simulation or system may have a different effect on the FTA result. For example, for an FTA of an airplane a threshold may be Aircraft flight length, any failure occurring after Aircraft flight length may not affect the outcome of the analysis, thus a mixed continuous-discrete pdf may be utilized. In additional embodiments the threshold in a given system may divide the pdf differently so that the pdf is continuous after the threshold and discrete before the threshold. In additional embodiments several thresholds may exist yielding a segmented pdf with several continuous or discrete sections. Accordingly, HISM may receive a threshold such as T depicted in the figure and may output, relay or produce a modified pdf function which may be a mixed continuous or discrete segmented according to threshold T.

According to some embodiment, a parameter determination module (PDM) such as PDM 105 may receive an initial cumulative distribution function (CDF). Exemplary pdms are discussed in more detail with regard to FIG. 3. PDM 105 may utilize the PDF and CDF relative to elements in the system and analyze or determine parameters associated with them in initial stochastic simulations. The PDM may then output a modified CDF and the calculated parameters.

According to some embodiments of the present invention, a fault tree (FT) such as FT 107 may receive the discrete and continuous PDFs, the modified CDF and the calculated parameters and may calculate the analysis using a stochastic simulator and output a result which may include the system's failure probability.

Figure 2A:
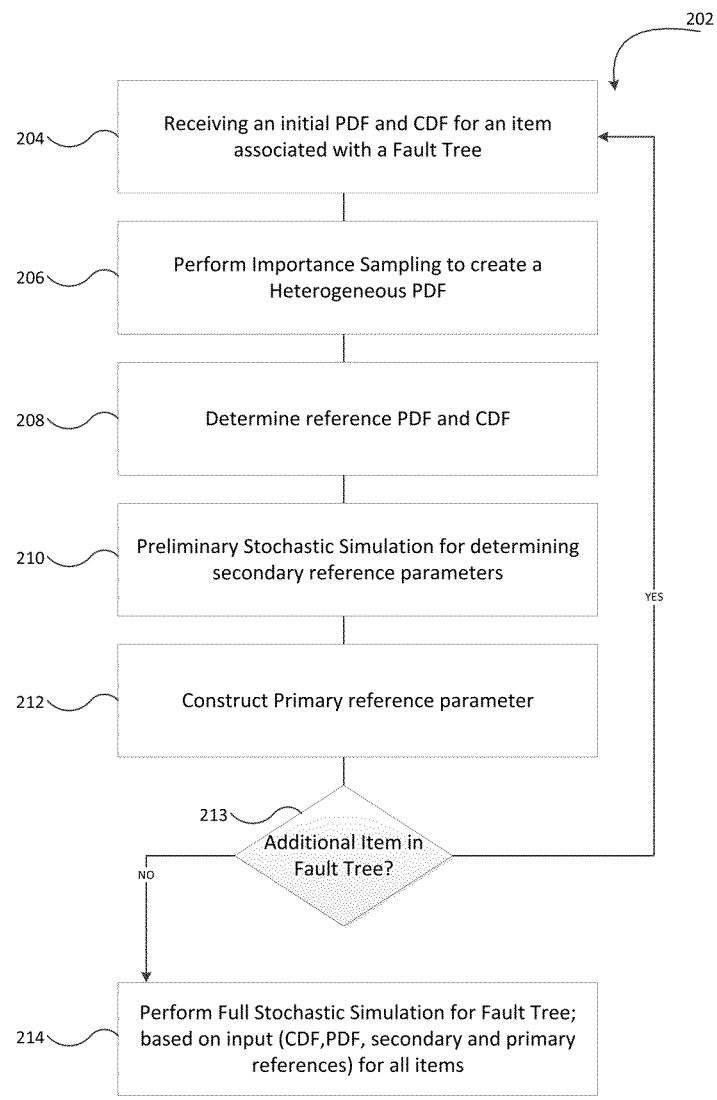
FIGS. 2A & 2B show flow charts including the steps of an exemplary method for carrying out FTA in accordance with some embodiments of the invention.

Turning now to FIG. 2A, depicted is a flow chart 202 including the steps of an exemplary method for carrying out FTA in accordance with some embodiments of the invention. In accordance with an exemplary embodiment, the probability of system failure (P) may be represented by the following equation:

$$P = \frac{1}{K} * \sum_{j=1}^{K} I(t_j) * \left\{ \frac{\prod_{i=1}^{N} f_i(t_{j_i})}{\prod_{i=1}^{N} g_i(t_{j_i})} \right\}$$

Where K is the amount of simulation cycles, j is the index of simulation cycle (j=1 ... K), N is the amount of Fault tree Items and i is an index of fault tree Items (i=1 ... N). $g_i(t)$ is a reference pdf and $G_i(t)$ is a reference CDF.

I(tj) is an indicator function for simulation number j. For example an optional definition for the function may be:

I(tj)=1, if S(tj)<threshold; otherwise, I(tj)=0. Threshold T described with regard to FIG. 1 is an optional example of this threshold.

S(t)—function to calculate System Failure Time according to Fault Tree structure for vector t of Items (System Basic Events) failure times An initial CDF ($F_i(t)$) and PDF ($f_i(t)$) are received associated with a specific item in a fault tree (step 204). Threshold T may also be input at step 204, or may be predefined. Importance sampling may then be performed to create a heterogeneous PDF (step 206). In accordance with the above example, P may thus be represented by the following equation:

$$P = \frac{1}{K} * \sum_{j=1}^{K} I(t_j) * \left\{ \frac{\prod_{i=1}^{N} \text{f\_modif}_i(t_{j_i})}{\prod_{i=1}^{N} \text{g\_modif}_i(t_{j_i})} \right\},$$

where
f_modif$_i(t_{ji})$=f$_i(t_{ji})$, if $t_{ji}$<T, otherwise f_modif$_i(t_{ji})$=1−F$_i$(T)
g_modif$_i(t_{ji})$=g$_i(t_{ji})$, if $t_{ji}$<T, otherwise g_modif$_i(t_{ji})$=1−G$_i$(T)

Reference PDF and CDF functions may be determined (step 206). Following are examples of calculating or determining g(t) from an initial f(t):

Translation: g(t)=f(t−a) or scaling:

$$g(t) = \frac{1}{a} * f(t/a).$$

If we choose the above scaling method $$g(t) = \frac{1}{a} * f(t/a)$$

an exponential pdf function may result in:

$$f(t) = \frac{1}{u} * \exp(-t/u),$$

we may calculate, that $$g(t) = \frac{1}{v} * \exp(-t/v)$$

and, so,

G(t)=1−exp(−t/v) where v may be defined as a control reference parameter.

In an additional example, if f(t) is a Weibull PDF where f(t)=b*(u$^{(-b)}$)*(t$^{(b-1)}$)*exp(−(t/u)$^b$), we may calculate that g(t)=b*(v$^{(-b)}$)*(t$^{(b-1)}$)*exp(−(t/v)$^b$), and, so, G(t)=1−exp(−(t/v)$^b$). Optionally secondary parameters may be introduced in order to simplify, assist in simulating or calculating reference parameter v. For example $$1 - G_i(t) = \frac{1 - F_i(t)}{D}$$

where D is a common (to all Items) secondary control reference parameter. For example for Importance Sampling Scaling transformation the following expressions result:

$$v_i = 1 \bigg/ \left( \frac{1}{u_i} + \frac{\log(D)}{T} \right)$$

for Exponential PDF of $f_i(t)$ $$v_i = \frac{T}{\left( \left(\frac{T}{u_i}\right)^{b_i} + \log(D) \right)^{\left(\frac{1}{b_i}\right)}}$$

for Weibull PDF of $f_i(t)$

In accordance with further embodiments D may vary between items and different expressions may result than above. Secondary reference D may be found using a (step 210) and primary reference parameters constructed (step 212).

Optionally, some or all of steps 204-212 may be carried out for additional fault tree items, depending on the differences and characteristics of the items as well as system definitions. When enough information regarding fault tree items/elements is aggregated, stored or calculated a full stochastic simulation for the fault tree may be performed yielding a result such as the probability of a particular system level failure (step 214).

Figure 2B:
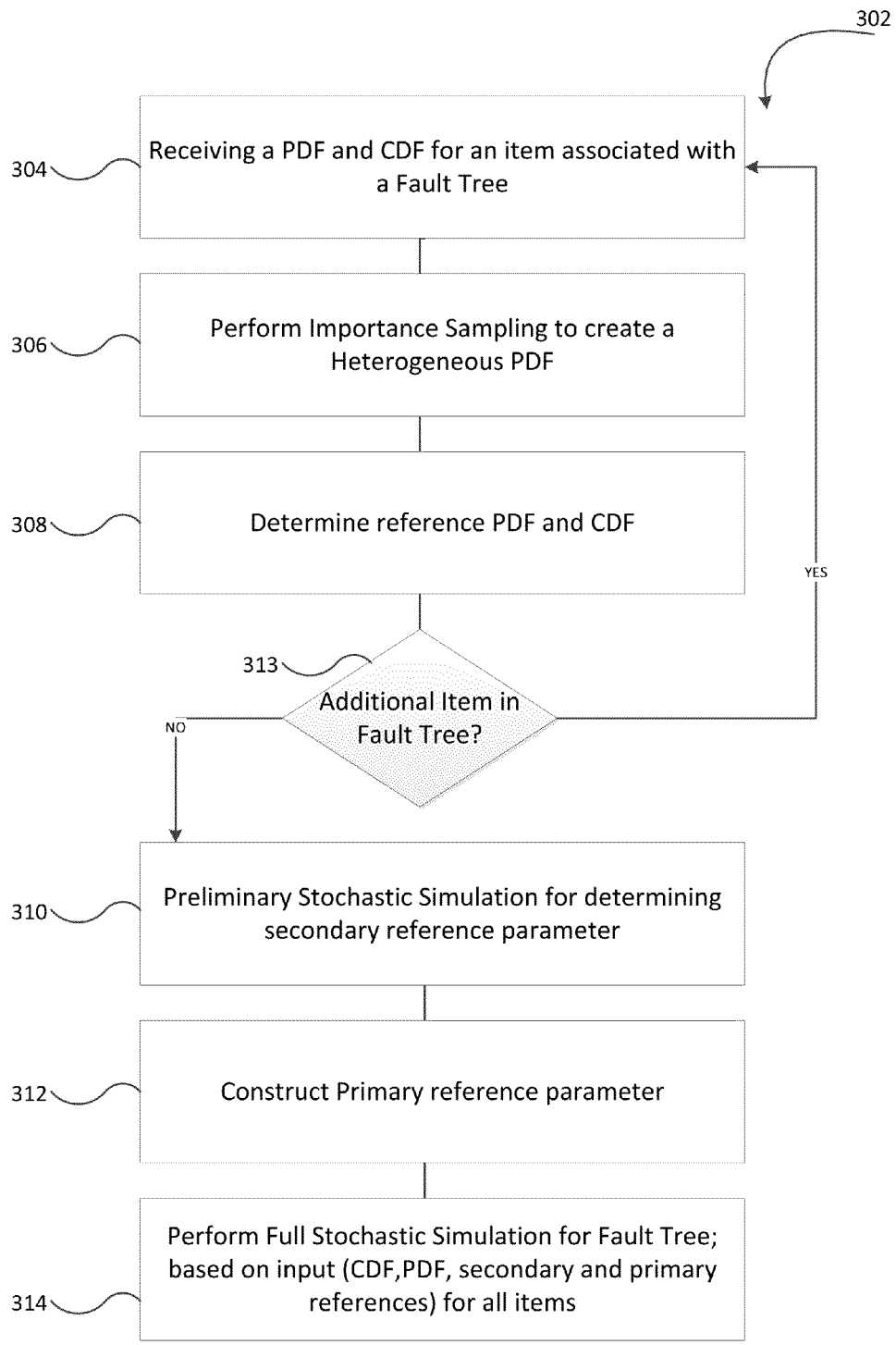

Turning now to FIG. 2B, depicted is a depicted is a flow chart 302 including the steps of an exemplary method for carrying out FTA in accordance with some embodiments of the invention. It is understood that steps 304-314 are substantially analogous to steps 204-214 of FIG. 2A. FIG. 2B, depicts an exemplary embodiment where a single secondary reference is used for all of the fault tree items.

Figure 3:
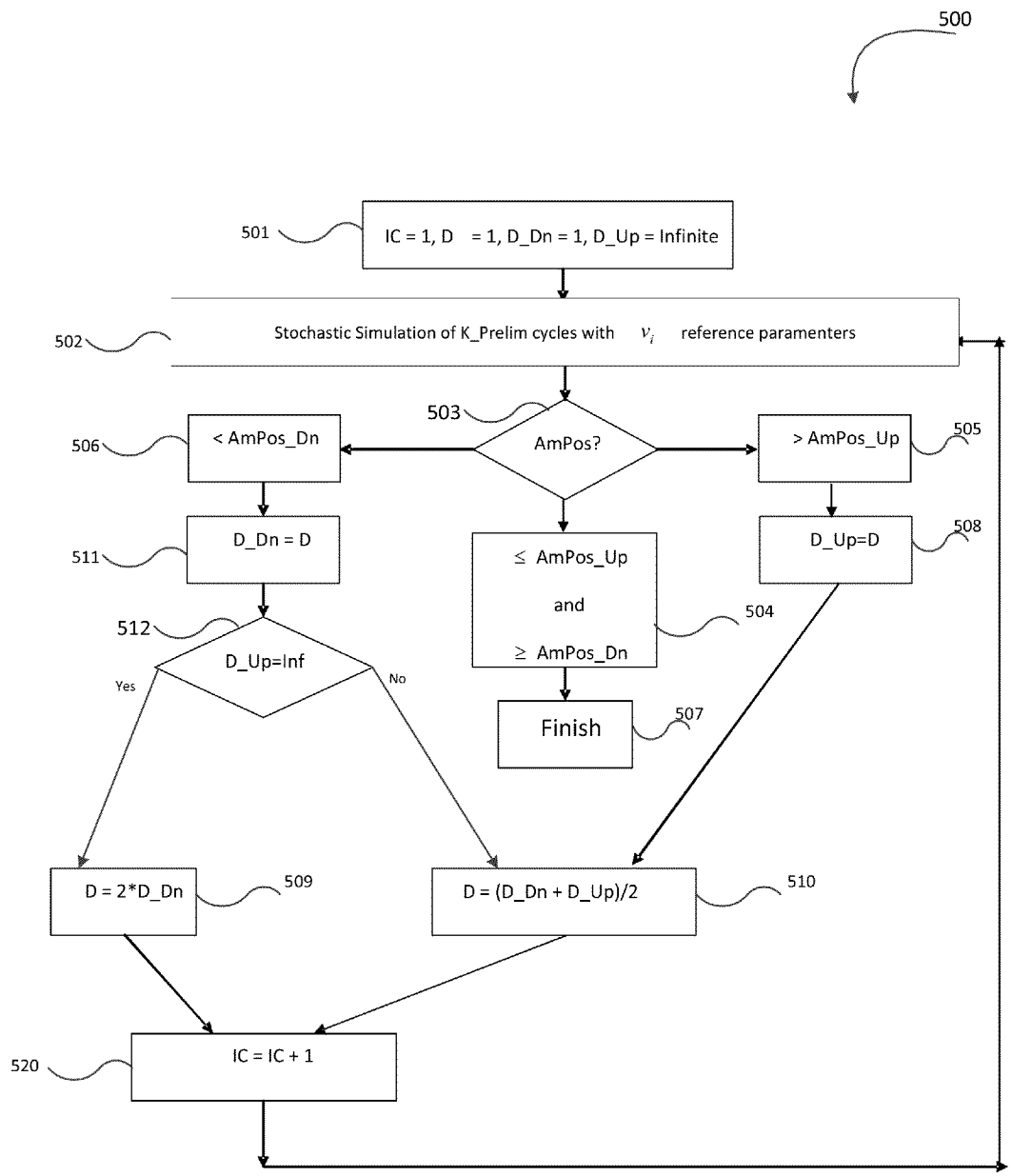
FIG. 3 shows an exemplary flow chart for a method of determining primary and secondary reference parameters in accordance with some embodiments of the present invention.

Turning now to FIG. 3, depicted is an exemplary flow chart (500) for a method of carrying out stochastic simulation to determine primary and secondary reference parameters in accordance with some embodiments of the present invention. For an initial iteration the reference parameters $v_i$ may be set as equal to $u_i$ for all items (which may correspond to D=1) (step 501). A preliminary stochastic simulation for K_Prelim number of cycles with the initially determined $v_i$ values may be carried out (step 502). The number of simulation cycles it took to detect a system level failure (AmPos) may be calculated (step 503). Depending on the AmPos value (step 504, 505, 506) compared to predefined simulation parameters such as minimal value of AmPos (AmPos_Dn) and maximum value of AmPos (AmPos_Up) it is determined if to conclude the simulation (step 507) or modify the value of D (step 508, 509, 510, 511, 512) and rerun the simulation and the number of simulation counter increased (step 520).

In accordance with some embodiments of the present invention, it is understood that steps 504, 505 and 506 may be modified so that instead of searching for a number of cycles that are within a range (AmPos_Dn and AmPos_Up) the method may be executed in order to find AmPos which is nearest to the value AmPos_Dn, a different method may implemented in order to continue running simulations until AmPos that is identical to AmPos_Dn is found and so on. Modification of value D (steps 508, 509, 510, 511 and 512) may be modified accordingly to match a modified search for AmPos.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A dynamic fault tree analysis (dfta) system, comprising:
first processing circuitry including a fault tree module associated with a mission critical system (mcs), wherein said fault tree module includes at least one item characterized by an initial probability density function (pdf);
at least one threshold value associated with the mcs;
second processing circuitry including a sampling module configured to transform the initial pdf to a heterogeneous pdf (hpdf), wherein the hpdf includes at least one continuous segment and at least one discrete segment; wherein transition between segments is at least partially based on the at least one threshold; and
third processing circuitry including a stochastic simulator configured to determine the probability of a mcs failure condition by analyzing the fault tree module using the heterogeneous pdf.

2. The dfta according to claim 1, wherein the mcs is an airplane and the threshold value is the airplane flight time.

3. The dfta according to claim 1, wherein the initial pdf is associated with a cumulative distribution function (cdf) including one or more parameters.

4. The dfta according to claim 3, further comprising a parameter determination module configured to utilize a stochastic simulation to calculate the one or more parameters associated with the cdf.

5. The dfta according to claim 3, wherein at least one parameter is configured to limit total length of stochastic simulator simulation for determining the probability of a mcs failure.

6. The dfta according to claim 4, wherein the parameter determination module is configured to recalculate the one or more parameters associated with the cdf if a simulation requirement has not been achieved.

7. The dfta according to claim 6, wherein the simulation requirement is selected from the group consisting of: a maximal amount of simulation cycles until system level failure is detected, a minimal amount of simulation cycles until system level failure is detected and a nominal amount of simulation cycles within a predefined range until system level failure is detected.

8. The dfta according to claim 1, wherein at least one initial pdf is represented by a Weibull function.

9. The dfta according to claim 1, wherein at least one initial pdf is represented by an exponential function and at least one initial pdf is represented by a Weibull function.

10. The dfta according to claim 1, wherein the stochastic simulator is a computer configured to carry out Monte Carlo analysis.

11. A method of calculating probability of mission critical system (mcs) failure comprising:
receiving a fault tree associated with the mcs including at least one item, wherein the items are characterized by an initial probability density function (pdf);
receiving at least one threshold value associated with the mcs;
sampling the initial pdf and determining a heterogeneous pdf (hpdf) including at least one continuous segment and at least one discrete segment, wherein transition between segments is determined at least partially by the threshold; and
performing a stochastic simulation on the fault tree utilizing the heterogeneous pdf to determine probability of a mcs failure condition.

12. The method of calculating probability of mcs failure according to claim 11, wherein the mcs is an airplane and the at least one threshold value is the airplane flight time.

13. The method of calculating probability of mcs failure according to claim 11, wherein the initial pdf is associated with a cumulative distribution function (cdf) including one or more parameters.

14. The method of calculating probability of mcs failure according to claim 13, further comprising the step of determining one or more parameters associated with the cdf with a stochastic simulator.

15. The method of calculating probability of mcs failure according to claim 13, wherein at least one parameter is configured to limit total length of stochastic simulator simulation for determining the probability of a mcs failure.

16. The method of calculating probability of mcs failure according to claim 14, further comprising recalculating the one or more parameters associated with the cdf if a simulation requirement has not been achieved.

17. The method of calculating probability of mcs failure according to claim 16, wherein the simulation requirement is selected from the group consisting of: a maximal amount of simulation cycles until system level failure is detected, a minimal amount of simulation cycles until system level failure is detected and a nominal amount of simulation cycles within a predefined range until system level failure is detected.

18. The method of calculating probability of mcs failure according to claim 11, wherein at least one initial pdf is represented by an exponential function.

19. The method of calculating probability of mcs failure according to claim 11, wherein performing a stochastic simulation is carrying out a Monte Carlo analysis.

20. A system for calculating probability of mission critical system (mcs) failure, said system comprising:
   a processor functionally associated with a digital memory, which digital memory stores processor executable code adapted to cause one or more processors to:
   receive a fault tree associated with the mcs including at least one item, wherein the items are characterized by an initial probability density function (pdf);
   receive at least one threshold value associated with the mcs;
   sample the initial pdf and determine a heterogeneous pdf (hpdf) including at least one continuous segment and at least one discrete segment, wherein transition between segments is determined at least partially by the threshold; and
   perform a stochastic simulation on the fault tree utilizing the heterogeneous pdf to determine probability of a mcs failure condition.

* * * * *